UNITED STATES PATENT OFFICE.

PAUL LOUIS TOUSSAINT HÉROULT, OF LA PRAZ, FRANCE, ASSIGNOR TO SOCIÉTÉ ELECTRO-METALLURGIQUE FRANCAISE, OF FROGES, ISÈRE, FRANCE.

PROCESS OF PURIFYING METALS.

No. 851,167.  Specification of Letters Patent.  Patented April 23, 1907.

Application filed April 28, 1906. Serial No. 314,256.

*To all whom it may concern:*

Be it known that I, PAUL LOUIS TOUSSAINT HÉROULT, a citizen of the Republic of France, residing at La Praz, Savoie, France, have invented a certain new and useful Improved Process of Purifying Metals, of which the following is a specification.

The invention aims to provide an improved process for separating out the impurities of a metal, and especially for separating out impurities such as phosphorus and sulphur from steel or other varieties of iron, so as to make a steel of high purity.

Certain other features of improvement are referred to hereinafter.

A bath of the metal is prepared, and is oxidized to such an extent as to transfer the impurities therefrom to the slag while maintaining its melting point below the temperature of the furnace, so that it remains liquid until the transfer of the impurities is substantially complete. The metal is then solidified, while the slag is maintained molten, and the slag with the impurities is removed, after which the metal is remelted and treated as desired to obtain the final composition.

We will describe in detail the application of the process to the purification of steel. It is assumed that a basic Siemens furnace of the tilting type is used, as this is the most convenient, but it will be apparent that the process is not restricted to any particular apparatus. The fusing point of steel or iron varies with the composition, increasing with the purity of the metal. Crucible steel (containing say 1 per cent. of carbon), for example, fuses at approximately 1400 degrees centigrade. As the carbon is reduced, we have soft steel of say 0.10 per cent. carbon, which fuses at approximately 1600 degrees centigrade. Substantially pure iron (deoxidized) fuses at approximately 1900 degrees centigrade. If, however, the iron of substantial purity (containing say 0.01 per cent. carbon, 0.01 per cent. phosphorus, and 0.015 per cent. sulphur) be superoxidized, its fusing point is reduced. When it contains roughly about 0.75 per cent. oxygen, its fusing point is lower than that of soft steel, both of these being well within the temperature attainable in a Siemens furnace. The present invention utilizes these variations in the fusing point, and it is assumed that the temperature of the furnace throughout the process is maintained above the fusing point of soft steel and below that of pure iron deoxidized.

It has heretofore been customary in the conversion of pig iron or scrap iron into steel, to arrest the oxidizing process at such a point as to leave within the bath a substantial percentage of phosphorus and sulphur. The continuation of the oxidation which would be necessary to substantially eliminate the impurities, has been carefully avoided, because the iron begins to be superoxidized before the complete elimination of the impurities, and such superoxidized iron has been considered practically useless and unmanageable.

According to the present invention the oxidation of the bath is continued not only until the desired percentage of the carbon has been oxidized, but beyond this point until substantially pure iron superoxidized is obtained. In this superoxidation substantially the whole of the impurities are transferred to the slag. The pure metal is then deoxidized, so that its melting point is quickly raised above the temperature of the furnace. It solidifies as soon as it is sufficiently deoxidized, and we thus have in the furnace a solid base of deoxidized pure iron very smooth on its upper surface, and upon which there is a molten slag which can be readily removed, carrying with it the impurities which have been extracted from the iron. It is for the purpose of dumping the slag that a tilting furnace is advantageous. The surface of the iron is so smooth that the slag may be removed almost to the last drop. The impurities being withdrawn, the pure iron may be converted into steel of any desired composition. For example, to make soft steel or crucible steel, both of which fuse at the temperature of the furnace, it is only necessary to add carburizing materials, such, for example, as carburite (a mixture of carbon and iron) or pig iron of high purity. A neutral slag is also applied to the surface of the metal to protect it from the oxidizing action of the flame. The continuance of the process will be in accordance with the usual practice, and depend upon the product desired, which may, for example, be basic open-hearth steel of high purity.

The raw material may be ordinary scrap which is melted down and oxidized by the flame and by the ore usually added. The bath may be fed with additional scrap or pig, only taking precautions not to deoxidize it.

After the bath is well melted and superoxidized, the deoxidation may be effected by adding pig, the conditions being continued until the freezing occurs.

Any neutral slag may be used for the last stage of the process, such, for example, as lime, sand, and clay, or other materials which will be fluid and protect the metal from the flame. The slag is not expected to exert any chemical effect on the steel, inasmuch as there is nothing to be removed therefrom.

After the final melting of the steel, it may receive the usual additions of manganese, silicon, aluminum, or the like, to ensure the casting of sound ingots as far as possible.

By this process steel of very high purity may be obtained from very poor or impure stock.

The heat of the furnace referred to herein is the heat to which the metal in the furnace is brought.

The process may also be carried out in an electric furnace without substantial variation of the details described.

Though I have described with great particularity of detail a specific process embodying my invention, yet it is not to be understood that the invention is limited to the particular process described.

Various modifications thereof in detail may be made by those skilled in the art without departure from the invention.

What I claim is:—

1. The process of making iron or steel of high purity, which consists in forming a bath of steel and superoxidizing it by addition of ore and by exposure to oxidizing flame and thus transferring the impurities to the slag, feeding scrap or pig iron to the bath so slowly as not to deoxidize the bath, until substantially the desired total charge is reached, adding pig iron at such a rate as to raise the melting point above the heat of the furnace and to solidify the metal, removing the slag with the impurities from the solid metal so that only the substantially pure solid metal remains, and adding a carburizing material of high purity and introducing a neutral slag to protect the surface of the metal from the oxidizing influence of the flame, until the melting point is lowered to a point below the heat of the furnace.

2. The process of making iron or steel of high purity, which consists in forming a bath of steel and superoxidizing it to transfer the impurities to the slag, adding deoxidizing materials to raise the melting point above the heat of the furnace and to solidify the metal, removing the slag with the impurities from the solid metal, and adding a neutral slag and carbon to lower the melting point and form a molten bath of iron substantially free from impurities.

3. The process of separating impurities from a bath of steel, which consists in oxidizing it sufficiently to transfer the impurities to the slag while maintaining its melting point below the temperature of the furnace, solidifying the steel while maintaining the slag molten, and removing the slag with the impurities.

4. The process of separating impurities from a bath of steel, which consists in oxidizing it sufficiently to transfer the impurities to the slag while maintaining its melting point below the temperature of the furnace, deoxidizing the steel to raise its melting point above the temperature of the furnace and to solidify it while maintaining the slag molten, and removing the slag with the impurities.

5. The process of separating the slag completely from a bath of steel, which consists in solidifying the steel while maintaining the slag molten, and removing the molten slag from the solid steel.

In witness whereof, I have hereunto signed my name in the presence of two subscribing witnesses.

PAUL LOUIS TOUSSAINT HÉROULT.

Witnesses:
D. ANTHONY USINA,
THEODORE T. SNELL.